US012564292B2

(12) United States Patent
McConnell et al.

(10) Patent No.: US 12,564,292 B2
(45) Date of Patent: Mar. 3, 2026

(54) COUNTERTOP KITCHEN APPLIANCE SYSTEM

(71) Applicant: WHIRLPOOL CORPORATION, Benton Harbor, MI (US)

(72) Inventors: John W. McConnell, St. Joseph, MI (US); Brandon T. Mock, St. Joseph, MI (US); Daniel P. Valenti, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 279 days.

(21) Appl. No.: 18/355,009

(22) Filed: Jul. 19, 2023

(65) Prior Publication Data

US 2025/0024998 A1 Jan. 23, 2025

(51) Int. Cl.
| | |
|---|---|
| *A47J 43/08* | (2006.01) |
| *A47J 27/00* | (2006.01) |
| *A47J 43/046* | (2006.01) |
| *A47J 43/07* | (2006.01) |
| *H02J 7/00* | (2006.01) |

(52) U.S. Cl.
CPC ........... *A47J 43/085* (2013.01); *A47J 27/004* (2013.01); *A47J 43/046* (2013.01); *A47J 43/0722* (2013.01); *H02J 7/0042* (2013.01)

(58) Field of Classification Search
CPC ........ A47J 43/04; A47J 43/044; A47J 43/046; A47J 43/07; A47J 43/0705; A47J 43/0711; A47J 43/0716; A47J 43/0722; A47J 43/0727; A47J 43/085; A47J 2043/04454
See application file for complete search history.

(56) References Cited

U.S. PATENT DOCUMENTS

| | | | |
|---|---|---|---|
| 9,585,520 B2 | 3/2017 | Liu | |
| 10,638,886 B2 | 5/2020 | Kolar | |
| 10,827,879 B2 | 11/2020 | Martin | |
| 11,510,528 B2 * | 11/2022 | Ganahl | A47J 43/0716 |

(Continued)

FOREIGN PATENT DOCUMENTS

| | | |
|---|---|---|
| GB | 2387764 A | 10/2003 |
| KR | 20160004399 U | 12/2016 |

(Continued)

*Primary Examiner* — Bobby Yeonjin Kim
(74) *Attorney, Agent, or Firm* — Price Heneveld LLP

(57) ABSTRACT

A countertop kitchen appliance system includes a countertop kitchen appliance and a charging platform. The countertop kitchen appliance includes a base having a motor disposed therein, a receptacle coupled to the base and configured to receive food therein, a rotatable tool disposed within the receptacle and operably coupled to the motor such that operation of the motor drives rotation of the rotatable tool, a heater configured to heat food received within the receptacle, and a battery coupled to the motor and the heater. The countertop kitchen appliance is operable between docked and undocked conditions. In the docked condition, the countertop kitchen appliance is operably coupled to the charging platform such that current is delivered from the charging platform to the battery. In the undocked condition, the countertop kitchen appliance is removed from the charging platform and the battery is operable to power operation of the motor and the heater.

20 Claims, 5 Drawing Sheets

(56)        References Cited

U.S. PATENT DOCUMENTS 11,690,482 B1 *   7/2023   Pamplin ................... H02J 7/02
                                                                    241/30
2001/0036124 A1   11/2001  Rubenstein
2011/0024537 A1 *  2/2011  Gonzalez ............. A47J 43/046
                                                                    215/11.1
2015/0165402 A1 *  6/2015  King ................ B01F 35/32025
                                                                    366/145
2017/0224169 A1    8/2017  Kolar
2019/0183289 A1    6/2019  Grunwell
2021/0038029 A1    2/2021  Martin
2022/0304494 A1 *  9/2022  Pamplin ............... A47J 43/085
2023/0080634 A1 *  3/2023  Kraut-Reinkober .... A47J 44/00
                                                                    99/325

FOREIGN PATENT DOCUMENTS

WO      WO-2007107888 A2 *  9/2007   ............. H02J 50/10
WO      WO-2017085073 A1 *  5/2017   ............. A47J 31/44

* cited by examiner

COUNTERTOP KITCHEN APPLIANCE SYSTEM

BACKGROUND OF THE DISCLOSURE

The present disclosure generally relates to a countertop kitchen appliance system. More specifically, the present disclosure relates to a countertop kitchen appliance system that includes a countertop kitchen appliance and a charging platform upon which the countertop kitchen appliance can be docked.

SUMMARY OF THE DISCLOSURE

According to one aspect of the present disclosure, a countertop kitchen appliance system includes a countertop kitchen appliance and a charging platform. The countertop kitchen appliance includes a base having a motor disposed therein, a receptacle coupled to the base and configured to receive food therein, a rotatable tool disposed within the receptacle and operably coupled to the motor such that operation of the motor drives rotation of the rotatable tool, a heater configured to heat food received within the receptacle, and a battery coupled to the motor and the heater. The countertop kitchen appliance is operable between a docked condition and an undocked condition. In the docked condition, the countertop kitchen appliance is operably coupled to the charging platform such that current is delivered from the charging platform to the battery. In the undocked condition, the countertop kitchen appliance is removed from the charging platform and the battery is operable to power operation of the motor and the heater.

According to another aspect of the present disclosure, a countertop kitchen appliance system includes a countertop kitchen appliance and a charger. The countertop kitchen appliance includes a receptacle for receiving food therein, a heater configured to heat food within the receptacle, and a battery coupled to the heater. The countertop kitchen appliance is operable between a docked condition and an undocked condition. In the docked condition, current is delivered from the charger to the battery and the heater is operable to heat food within the receptacle to a first maximum temperature. In the undocked condition, the battery is disconnected from the charger and the heater is operable to heat food within the receptacle to a second maximum temperature. Further, the first maximum temperature is greater than the second maximum temperature.

According to yet another aspect of the present disclosure, a countertop kitchen appliance system includes a first countertop kitchen appliance, a second countertop kitchen appliance, and a charging platform. The first countertop kitchen appliance includes a receptacle for receiving food therein, and a heater configured to heat food within the receptacle of the first countertop kitchen appliance. The second countertop kitchen appliance includes a base having a motor disposed therein, a receptacle coupled to the base for receiving food therein, a rotatable tool disposed within the receptacle of the second countertop kitchen appliance and operably coupled to the motor, such that operation of the motor drives rotation of the rotatable tool, and a battery coupled to the motor. The first countertop kitchen appliance is operable between a docked condition and an undocked condition. In the docked condition, the first countertop kitchen appliance is operably coupled to the charging platform and the heater is operable to heat food. In the undocked condition, the first countertop kitchen appliance is removed from the charging platform. Further, the second countertop kitchen appliance is operable between a docked condition and an undocked condition. In the docked condition, the second countertop kitchen appliance is operably coupled to the charging platform such that current is delivered from the charging platform to the battery. In the undocked condition, the second countertop kitchen appliance is removed from the charging platform and the battery is operable to power operation of the motor.

These and other features, advantages, and objects of the present disclosure will be further understood and appreciated by those skilled in the art by reference to the following specification, claims, and appended drawings.

Figure 1:
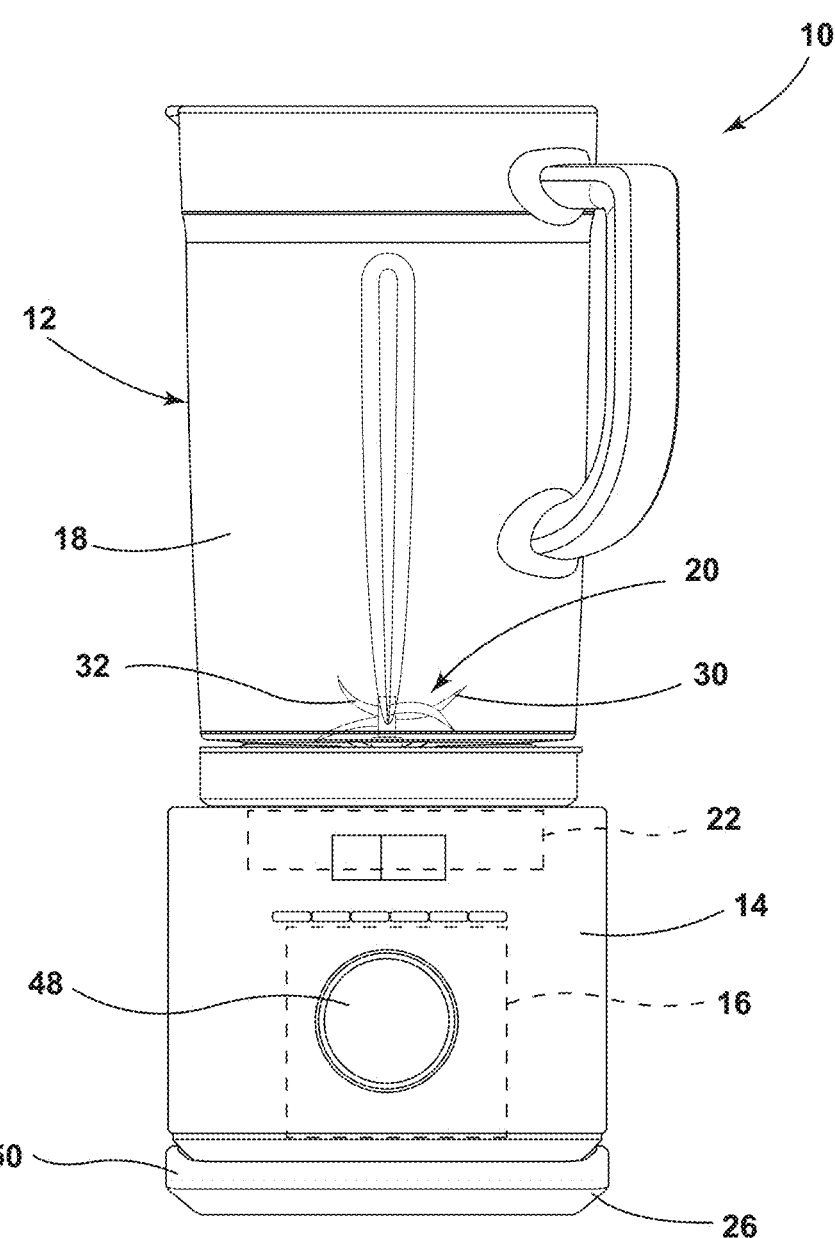
FIG. 1 is a front elevational view of a charging platform and a countertop kitchen appliance in a docked condition relative to the charging platform.

The components in the figures are not necessarily to scale, emphasis instead being placed upon illustrating the principles described herein.

DETAILED DESCRIPTION

The present illustrated embodiments reside primarily in combinations of apparatus components related to a countertop kitchen appliance system. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that an article or apparatus that comprises a list of elements does not include only those elements but may include other elements not expressly listed or inherent to such article or apparatus. An element preceded by "comprises a . . . " does not, without more constraints, preclude the existence of additional identical elements in the article or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top and bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-5, a countertop kitchen appliance system 10 includes a countertop kitchen appliance 12. The countertop kitchen appliance 12 includes a base 14. A motor 16 is disposed within the base 14. A receptacle 18 is coupled to the base 14 and is configured to receive food therein. A rotatable tool 20 is disposed within the receptacle 18 and is operably coupled to the motor 16, such that operation of the motor 16 drives rotation of the rotatable tool 20. A heater 22 is configured to heat food received within the receptacle 18. A battery 24 is coupled to the motor 16 and to the heater 22. The countertop kitchen appliance system 10 further includes a charging platform 26. The countertop kitchen appliance 12 is operable between a docked condition, wherein the countertop kitchen appliance 12 is operably coupled to the charging platform 26 such that current is delivered from the charging platform 26 to the battery 24, and an undocked condition, wherein the countertop kitchen appliance 12 is removed from the charging platform 26 and the battery 24 is operable to power operation of the motor 16 and the heater 22 of the countertop kitchen appliance 12.

Figure 2:
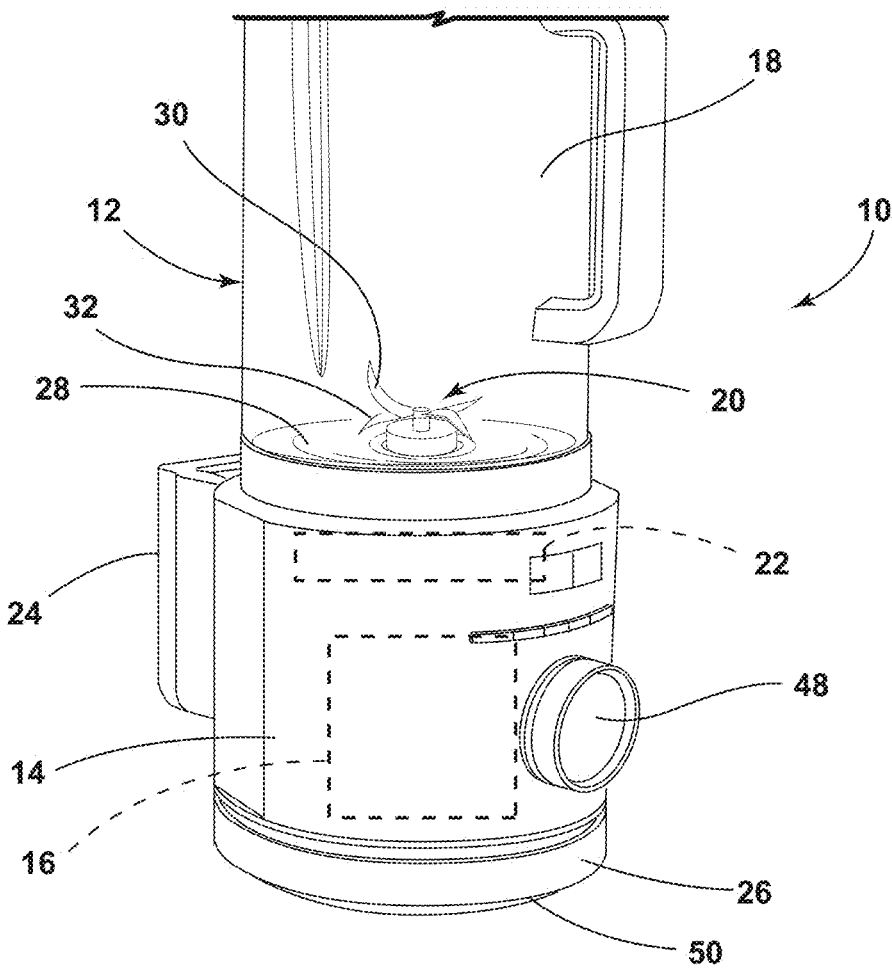
FIG. 2 is a perspective view of the countertop kitchen appliance in the docked condition.

Referring now to FIGS. 1 and 2, the countertop kitchen appliance system 10 includes the countertop kitchen appliance 12. In the embodiment illustrated in FIGS. 1 and 2, the countertop kitchen appliance 12 is a blender. It is contemplated that the countertop kitchen appliance 12 of the countertop kitchen appliance system 10 may be one or more of a variety of types of countertop kitchen appliances, in various implementations (e.g., warming dish, mixer, food processor, juicer, air fryer, hot pot, toaster, etc.). As described further herein, in some implementations, the countertop kitchen appliance system 10 can include a plurality of countertop kitchen appliances 12 of various sorts.

Figure 4:
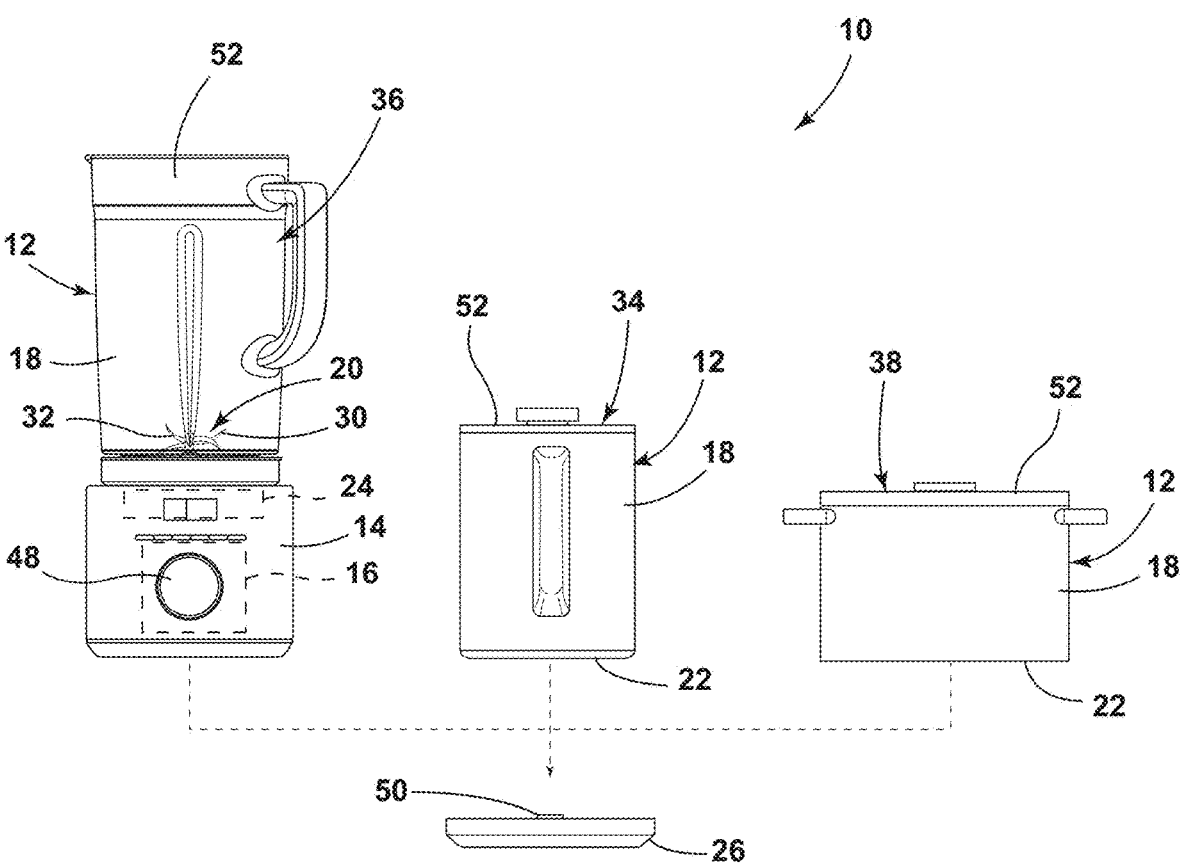
FIG. 4 is an elevational view of a countertop kitchen appliance system illustrating a first countertop kitchen appliance, a second countertop kitchen appliance, a third countertop kitchen appliance, and a charging platform compatible with each of the countertop kitchen appliances.

Referring now to FIGS. 1, 2, and 4, the countertop kitchen appliance 12 includes a receptacle 18. The receptacle 18 may be configured to receive food therein. In some embodiments, the countertop kitchen appliance 12 includes the heater 22 that is configured to heat food received within the receptacle 18. In various implementations, the heater 22 may be disposed within and/or downward of a bottom wall 28 of the receptacle 18. In some implementations, the countertop kitchen appliance 12 includes the base 14 having the motor 16 disposed therein, and the rotatable tool 20 that is operably coupled to the motor 16, such that operation of the motor 16 drives rotation of the rotatable tool 20. For example, the countertop kitchen appliance 12 may be a blender that includes the base 14, the motor 16 disposed within the base 14, the receptacle 18 coupled to the base 14, and the rotatable tool 20 in the form of a blender blade 30 that is disposed within the receptacle 18 and operably coupled to the motor 16 such that operation of the motor 16 drives rotation of the blender blade 30 within the receptacle 18. The rotatable tool 20 of the countertop kitchen appliance 12 may be at least one of a host of types of rotatable tools 20 that may include, but is not limited to, the blender blade 30, a food processing blade, a food processing disc, a mixer, a stirrer 32, a dough hook, a paddle, and/or a combination thereof.

Figure 5:
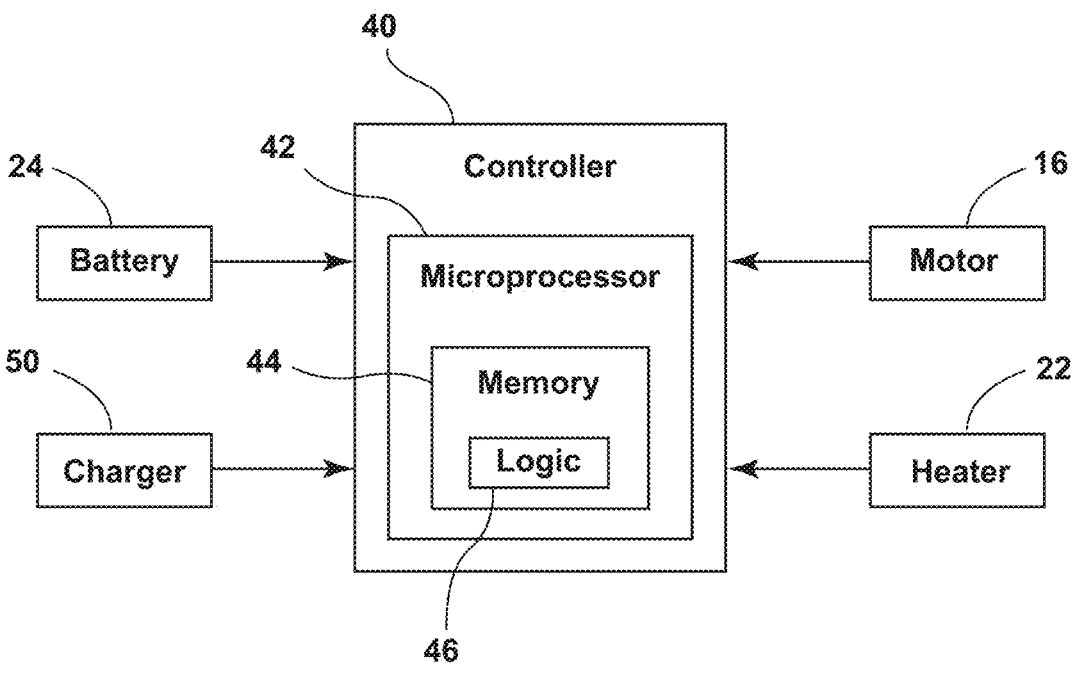
FIG. 5 is a block diagram illustrating a controller and various other electronic components of a countertop kitchen appliance system.

Referring now to FIGS. 1, 2, and 5, the countertop kitchen appliance 12 may include the battery 24. The battery 24 may be coupled to a variety of electronic components of the countertop kitchen appliance 12. For example, the battery 24 may be coupled to the motor 16 and/or the heater 22 of the countertop kitchen appliance 12 and configured to power operation of the motor 16 and/or heater 22 of the countertop kitchen appliance 12. A variety of types of batteries 24 are contemplated. In an exemplary embodiment, the battery 24 of the countertop kitchen appliance 12 may be a 20 V battery 24 that is coupled to the base 14 of the countertop kitchen appliance 12. In some implementations, the countertop kitchen appliance 12 of the countertop kitchen appliance system 10 may omit the battery 24. For example, in the embodiment illustrated in FIG. 4, wherein the countertop kitchen appliance system 10 includes a first countertop kitchen appliance 34, a second countertop kitchen appliance 36, and a third countertop kitchen appliance 38, the first countertop kitchen appliance 34 omits the battery 24, as described further herein.

Referring now to FIG. 5, the countertop kitchen appliance 12 can include a controller 40. The controller 40 may be configured to receive various inputs and control various outputs. The controller 40 may include a microprocessor 42 and memory 44. Stored within the memory 44 and executed by the microprocessor 42 is logic 46 for processing the various inputs and controlling the various outputs. In various implementations, the controller 40 is coupled with the motor 16 and/or the heater 22 of the countertop kitchen appliance 12. Further, the controller 40 may receive inputs from a variety of components of the countertop kitchen appliance system 10, such as a user interface 48 of the countertop kitchen appliance 12, the battery 24, a charger 50 for the battery 24, and/or one or more electronic components of the countertop kitchen appliance 12 that indicate a status of the battery 24 and/or the countertop kitchen appliance 12 (e.g., docked condition, undocked condition, etc.). As described further herein, the controller 40 may control operation of the motor 16 and/or the heater 22 of the countertop kitchen appliance 12 responsive to a variety of inputs received at the controller 40.

Referring now to FIGS. 1-5, the countertop kitchen appliance system 10 may include the charger 50. The charger 50 is configured to charge the battery 24 of the countertop kitchen appliance 12 and/or power an embodiment of the countertop kitchen appliance 12 that omits the battery 24. In various implementations, the countertop kitchen appliance 12 is operable between a docked condition, wherein current is delivered from the charger 50 to the battery 24 of the countertop kitchen appliance 12, and an undocked condition, wherein the battery 24 is disconnected from the charger 50 of the countertop kitchen appliance system 10.

Figure 3:
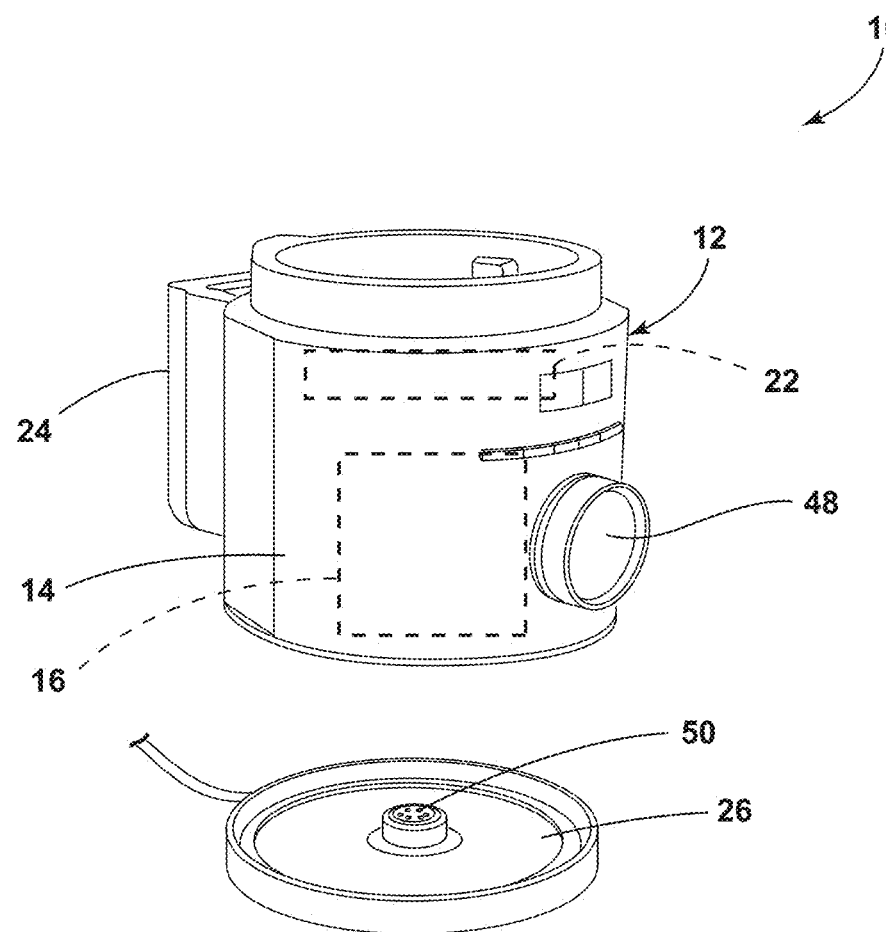
FIG. 3 is a top perspective view of the countertop kitchen appliance and the charging platform, illustrating the countertop kitchen appliance in an undocked condition relative to the charging platform.

In some implementations, the charger 50 of the countertop kitchen appliance system 10 comprises the charging platform 26, as illustrated in FIGS. 1-4. In the embodiment of the countertop kitchen appliance system 10 illustrated in FIGS. 2 and 3, the countertop kitchen appliance 12 is operable between the docked condition, as illustrated in FIG. 2, wherein the countertop kitchen appliance 12 is operably coupled to the charging platform 26 such that current is delivered from the charging platform 26 to the battery 24, and the undocked condition, as illustrated in FIG. 3, wherein the countertop kitchen appliance 12 is removed from the charging platform 26, such that current is not delivered from the charging platform 26 to the battery 24. The charging platform 26 may extend beneath the countertop kitchen appliance 12 in the docked condition of the countertop kitchen appliance 12, such that the charging platform 26 supports the countertop kitchen appliance 12 in the docked condition. For example, as illustrated in FIG. 2, the charging platform 26 extends beneath the base 14 of the countertop kitchen appliance 12 in the docked condition, such that the base 14 of the countertop kitchen appliance 12 is supported by the charging platform 26 in the docked condition. It is contemplated that the charging platform 26 may include terminals that correspond with electrical contacts of the countertop kitchen appliance 12 in the docked condition of the countertop kitchen appliance 12, such that current flows from the charging platform 26 to the countertop kitchen appliance 12 and/or the battery 24 of the countertop kitchen appliance 12 via the corresponding terminals and contacts. A variety of electrical connection methods that facilitate charging of the battery 24 are contemplated (e.g., inductive charging, etc.).

Referring now to FIGS. 2, 3, and 5, in an exemplary embodiment of the countertop kitchen appliance system 10, the countertop kitchen appliance system 10 includes the charger 50, and the countertop kitchen appliance 12 that comprises the receptacle 18, the heater 22, and the battery 24 coupled to the heater 22. The countertop kitchen appliance 12 is operable between the docked condition and the undocked condition relative to the charger 50. In the docked condition, current is delivered from the charger 50 to the battery 24 and the heater 22 is operable to heat food within the receptacle 18 to a first maximum temperature. In the undocked condition, the battery 24 is disconnected from the charger 50 and the heater 22 is operable to heat food within the receptacle 18 to a second maximum temperature, wherein the first maximum temperature is greater than the second maximum temperature.

In operation of the exemplary embodiment of the countertop kitchen appliance 12, the heater 22 may be operable to heat food to the first maximum temperature, which may be a temperature that is desirable for cooking food disposed within the receptacle 18 of the countertop kitchen appliance 12, while the countertop kitchen appliance 12 is in the docked condition. Further, the heater 22, in the undocked condition of the countertop kitchen appliance 12, may be operable to heat food within the receptacle 18 to the lower second maximum temperature that is desirable for warming or maintaining the warmth of food within the receptacle 18. In some implementations, the first maximum temperature is greater than 200° F. In some implementations, the second maximum temperature is greater than 100° F. In various implementations, the first maximum temperature may be at least 30° F. warmer than the second maximum temperature. The controller 40 of the countertop kitchen appliance 12 may control operation of the heater 22, such that the first maximum temperature is greater than the second maximum temperature based on logic 46 stored in memory 44. For example, the controller 40 may limit heat output by the heater 22 and/or intermittently deactivate the heater 22 during operation of the heater 22 in the undocked condition of the countertop kitchen appliance 12. The heater 22 being operable to heat food within the receptacle 18 to the second maximum temperature that is less than the first maximum temperature while the countertop kitchen appliance 12 is in the undocked condition may advantageously extend the battery life of the battery 24 of the countertop kitchen appliance 12.

In an exemplary embodiment of the countertop kitchen appliance system 10, the countertop kitchen appliance system 10 includes the charging platform 26 and the countertop kitchen appliance 12. The countertop kitchen appliance 12 includes the base 14 having the motor 16 disposed therein, the receptacle 18 coupled to the base 14 and configured to receive food therein, the rotatable tool 20 disposed within the receptacle 18 and operably coupled to the motor 16, the heater 22 configured to heat food received within the receptacle 18, and the battery 24 coupled to the motor 16 and the heater 22. The countertop kitchen appliance 12 is operable between the docked condition and the undocked condition. In the docked condition, the countertop kitchen appliance 12 is operably coupled to the charging platform 26 such that current is delivered from the charging platform 26 to the battery 24. Further, in the docked condition of the countertop kitchen appliance 12, the heater 22 is operable to heat food within the receptacle 18 to the first maximum temperature, and the motor 16 is operable to drive rotation of the rotatable tool 20 at a first maximum rate. In the undocked condition of the countertop kitchen appliance 12 of the exemplary embodiment, the countertop kitchen appliance 12 is removed from the charging platform 26 and the battery 24 is operable to power operation of the motor 16 and the heater 22. In the undocked condition, the heater 22 is operable to heat food within the receptacle 18 to the second maximum temperature, and the motor 16 is operable to drive rotation of the rotatable tool 20 at a second maximum rate. In various implementations, the first maximum temperature is greater than the second maximum temperature, and the first maximum rate of rotation is substantially equal to the second maximum rate of rotation.

Referring now to FIG. 4, in some implementations, the countertop kitchen appliance system 10 may include a plurality of countertop kitchen appliances 12. For example, as illustrated in FIG. 4, the countertop kitchen appliance system 10 includes the first countertop kitchen appliance 34, the second countertop kitchen appliance 36, and the third countertop kitchen appliance 38. The first countertop kitchen appliance 34 includes the receptacle 18 for receiving food therein, and the heater 22 that is configured to heat food within the receptacle 18. The second countertop kitchen appliance 36 includes the base 14 having the motor 16 disposed therein, the receptacle 18 coupled to the base 14 for receiving food therein, and the rotatable tool 20 disposed within the receptacle 18 and operably coupled to the motor 16. The second countertop kitchen appliance 36 also includes the battery 24 that is coupled to the motor 16. The third countertop kitchen appliance 38 includes the receptacle 18, the heater 22, and a lid 52.

The countertop kitchen appliance system 10 illustrated in FIG. 4 further includes the charging platform 26 which is configured to be selectively coupled to each of the first, second, and third countertop kitchen appliances 34, 36, 38. The first countertop kitchen appliance 34 is operable between the docked condition, wherein the first countertop kitchen appliance 34 is operably coupled to the charging platform 26 and the heater 22 is operable to heat food received within the receptacle 18 of the first countertop kitchen appliance 34, and the undocked condition, wherein the first countertop kitchen appliance 34 is removed from the charging platform 26. The second countertop kitchen appliance 36 is operable between the docked condition, wherein the second countertop kitchen appliance 36 is operably coupled to the charging platform 26 such that current is delivered from the charging platform 26 to the battery 24, and the undocked condition, wherein the second countertop kitchen appliance 36 is removed from the charging platform 26 and the battery 24 is operable to power operation of the motor 16. The third countertop kitchen appliance 38 is operable between the docked condition, wherein the third countertop kitchen appliance 38 is operably coupled to the charging platform 26, and the heater 22 of the third countertop kitchen appliance 38 is operable to heat food within the receptacle 18 of the third countertop kitchen appliance 38, and the undocked condition, wherein the third countertop kitchen appliance 38 is removed from the charging platform 26.

The charging platform 26 may extend beneath the first countertop kitchen appliance 34 in the docked condition of the first countertop kitchen appliance 34, such that the first countertop kitchen appliance 34 is supported by the charging platform 26. Further, the charging platform 26 may extend beneath the second countertop kitchen appliance 36 in the docked condition of the second countertop kitchen appliance 36, such that the charging platform 26 supports the second countertop kitchen appliance 36. In the embodiment illustrated in FIG. 4, the second countertop kitchen appliance 36 can include the heater 22. The heater 22 of the second countertop kitchen appliance 36 may be coupled to the battery 24 and configured to heat food received within the receptacle 18 of the second countertop kitchen appliance 36.

In operation of an exemplary embodiment of the countertop kitchen appliance system 10, a user fills the receptacle 18 of the countertop kitchen appliance 12 with food and utilizes the user interface 48 of the countertop kitchen appliance 12 to prompt the motor 16 to drive the rotatable tool 20 to blend the food within the receptacle 18. Next, the user utilizes the user interface 48 to prompt the heater 22 to heat the food within the receptacle 18. When the user determines that the food is thoroughly cooked, the user removes the countertop kitchen appliance 12 from the charging platform 26, and the heater 22 continues to operate in a warming mode at a lower temperature by drawing power from the battery 24 of the countertop kitchen appliance 12. As such, the food is maintained at a desirable temperature for eating while the countertop kitchen appliances 12 is in the undocked condition.

According to one aspect of the present disclosure, a countertop kitchen appliance system includes a countertop kitchen appliance and a charging platform. The countertop kitchen appliance includes a base having a motor disposed therein, a receptacle coupled to the base and configured to receive food therein, a rotatable tool disposed within the receptacle and operably coupled to the motor such that operation of the motor drives rotation of the rotatable tool, a heater configured to heat food received within the receptacle, and a battery coupled to the motor and the heater. The countertop kitchen appliance is operable between a docked condition and an undocked condition. In the docked condition, the countertop kitchen appliance is operably coupled to the charging platform such that current is delivered from the charging platform to the battery. In the undocked condition, the countertop kitchen appliance is removed from the charging platform and the battery is operable to power operation of the motor and the heater.

According to another aspect, the heater is operable to heat food within the receptacle to a first maximum temperature in the docked condition of the countertop kitchen appliance, and the heater is operable to heat food within the receptacle to a second maximum temperature in the undocked condition of the countertop kitchen appliance. Further, the first maximum temperature is greater than the second maximum temperature.

According to another aspect, the second maximum temperature is greater than 100 degrees Fahrenheit.

According to another aspect, the first maximum temperature is greater than 200 degrees Fahrenheit.

According to another aspect, the motor is operable to drive rotation of the rotatable tool at a first maximum rate in the docked condition of the countertop kitchen appliance, and the motor is operable to drive rotation of the rotatable tool at a second maximum rate in the undocked condition of the countertop kitchen appliance. Further, the first maximum rate of rotation is substantially equal to the second maximum rate of rotation.

According to another aspect, the rotatable tool comprises a blender blade that is configured to blend food received within the receptacle.

According to another aspect, the rotatable tool comprises a stirrer.

According to another aspect, the charging platform extends beneath the base in the docked condition of the countertop kitchen appliance, such that the charging platform supports the base in the docked condition of the countertop kitchen appliance.

According to another aspect, the battery is a 20 volt battery.

According to yet another aspect of the present disclosure, a countertop kitchen appliance system includes a countertop kitchen appliance and a charger. The countertop kitchen appliance includes a receptacle for receiving food therein, a heater configured to heat food within the receptacle, and a battery coupled to the heater. The countertop kitchen appliance is operable between a docked condition and an undocked condition. In the docked condition, current is delivered from the charger to the battery and the heater is operable to heat food within the receptacle to a first maximum temperature. In the undocked condition, the battery is disconnected from the charger and the heater is operable to heat food within the receptacle to a second maximum temperature. Further, the first maximum temperature is greater than the second maximum temperature.

According to another aspect, the second maximum temperature is greater than 100 degrees Fahrenheit.

According to another aspect, the first maximum temperature is greater than 200 degrees Fahrenheit.

According to another aspect, the countertop kitchen appliance further includes a base coupled to the receptacle, a motor disposed within the base and coupled with the battery, and a rotatable tool disposed within the receptacle and operably coupled with the motor such that operation of the motor drives rotation of the rotatable tool.

According to another aspect, the motor is operable to drive rotation of the rotatable tool at a first maximum rate in the docked condition of the countertop kitchen appliance, and the motor is operable to drive rotation of the rotatable tool at a second maximum rate in the undocked condition of the countertop kitchen appliance. Further, the first maximum rate of rotation is substantially equal to the second maximum rate of rotation.

According to another aspect, the rotatable tool comprises a blender blade that is configured to blend food received within the receptacle.

According to another aspect, the rotatable tool comprises a stirrer.

According to another aspect, the charger comprises a charging platform, and the charging platform extends beneath the countertop kitchen appliance in the docked condition of the countertop kitchen appliance such that the charging platform supports the countertop kitchen appliance in the docked condition of the countertop kitchen appliance.

According to yet another aspect of the present disclosure, a countertop kitchen appliance system includes a first countertop kitchen appliance, a second countertop kitchen appliance, and a charging platform. The first countertop kitchen appliance includes a receptacle for receiving food therein, and a heater configured to heat food within the receptacle of the first countertop kitchen appliance. The second countertop kitchen appliance includes a base having a motor disposed therein, a receptacle coupled to the base for receiving food therein, a rotatable tool disposed within the receptacle of the second countertop kitchen appliance and operably coupled to the motor, such that operation of the motor drives rotation of the rotatable tool, and a battery coupled to the motor. The first countertop kitchen appliance is operable between a docked condition and an undocked condition. In the docked condition, the first countertop kitchen appliance is operably coupled to the charging platform and the heater is operable to heat food. In the undocked condition, the first countertop kitchen appliance is removed from the charging platform. Further, the second countertop kitchen appliance is operable between a docked condition and an undocked condition. In the docked condition, the second countertop kitchen appliance is operably coupled to the charging platform such that current is delivered from the charging platform to the battery. In the undocked condition, the second countertop kitchen appliance is removed from the charging platform and the battery is operable to power operation of the motor.

According to another aspect, the charging platform extends beneath the first countertop kitchen appliance in the docked condition of the first countertop kitchen appliance, such that the first countertop kitchen appliance is supported by the charging platform. Further, the charging platform extends beneath the second countertop kitchen appliance in the docked condition of the second countertop kitchen appliance, such that the charging platform supports the second countertop kitchen appliance.

According to another aspect, the second countertop kitchen appliance includes a heater coupled to the battery and configured to heat food received within the receptacle of the second countertop kitchen appliance.

It will be understood by one having ordinary skill in the art that construction of the described disclosure and other components is not limited to any specific material. Other exemplary embodiments of the disclosure disclosed herein may be formed from a wide variety of materials, unless described otherwise herein.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A countertop kitchen appliance system, comprising:
a countertop kitchen appliance, comprising:
a base having a motor disposed therein;
a receptacle coupled to the base and configured to receive food therein;
a rotatable tool disposed within the receptacle and operably coupled to the motor such that operation of the motor drives rotation of the rotatable tool;
a heater configured to heat food received within the receptacle; and
a battery coupled to the motor and the heater;
a charging platform, wherein the countertop kitchen appliance is operable between a docked condition, wherein the countertop kitchen appliance is operably coupled to the charging platform such that current is delivered from the charging platform to the battery, and an undocked condition, wherein the countertop kitchen appliance is removed from the charging platform and the battery is operable to power operation of the motor and the heater; and a controller configured to control the operation of the heater, wherein the controller limits heat output by the heater when the countertop kitchen appliance is in the undocked condition such that the heater is operable to heat food received within the receptacle to a first maximum temperature in the docked condition and a second maximum temperature in the undocked condition, the first maximum temperature being greater than the second maximum temperature.

2. The countertop kitchen appliance system of claim 1, wherein the second maximum temperature is greater than 100 degrees Fahrenheit.

3. The countertop kitchen appliance system of claim 2, wherein the first maximum temperature is greater than 200 degrees Fahrenheit.

4. The countertop kitchen appliance system of claim 1, wherein the motor is operable to drive rotation of the rotatable tool at a first maximum rate in the docked condition of the countertop kitchen appliance, and the motor is operable to drive the rotation of the rotatable tool at a second maximum rate in the undocked condition of the countertop kitchen appliance, wherein the first maximum rate is substantially equal to the second maximum rate.

5. The countertop kitchen appliance system of claim 1, wherein the rotatable tool comprises a blender blade that is configured to blend food received within the receptacle.

6. The countertop kitchen appliance system of claim 1, wherein the rotatable tool comprises a stirrer.

7. The countertop kitchen appliance system of claim 1, wherein the charging platform extends beneath the base in the docked condition of the countertop kitchen appliance, such that the charging platform supports the base in the docked condition of the countertop kitchen appliance.

8. The countertop kitchen appliance system of claim 1, wherein the battery is a 20 volt battery.

9. A countertop kitchen appliance system, comprising a countertop kitchen appliance, comprising:

a receptacle for receiving food therein;
a heater configured to heat food within the receptacle;
a battery coupled to the heater; and
a controller; and
a charger, wherein the countertop kitchen appliance is operable between a docked condition, wherein current is delivered from the charger to the battery and the heater is operable to heat food within the receptacle to a first maximum temperature, and an un docked condition, wherein the battery is disconnected from the charger and the heater is operable to heat food within the receptacle to a second maximum temperature, and wherein the controller is configured to control the operation of the heater such that the first maximum temperature is greater than the second maximum temperature.

10. The countertop kitchen appliance system of claim 9, wherein the second maximum temperature is greater than 100 degrees Fahrenheit.

11. The countertop kitchen appliance system of claim 10, wherein the first maximum temperature is greater than 200 degrees Fahrenheit.

12. The countertop kitchen appliance system of claim 9, wherein the countertop kitchen appliance further comprises:

a base coupled to the receptacle;

a motor disposed within the base and coupled with the battery; and
a rotatable tool disposed within the receptacle and operably coupled with the motor such that operation of the motor drives rotation of the rotatable tool.

13. The countertop kitchen appliance system of claim 12, wherein the motor is operable to drive the rotation of the rotatable tool at a first maximum rate in the docked condition of the countertop kitchen appliance, and the motor is operable to drive the rotation of the rotatable tool at a second maximum rate in the undocked condition of the countertop kitchen appliance, wherein the first maximum rate is substantially equal to the second maximum rate.

14. The countertop kitchen appliance system of claim 12, wherein the rotatable tool comprises a blender blade that is configured to blend food received within the receptacle.

15. The countertop kitchen appliance system of claim 12, wherein the rotatable tool comprises a stirrer.

16. The countertop kitchen appliance system of claim 9, wherein the charger comprises a charging platform, and wherein the charging platform extends beneath the countertop kitchen appliance in the docked condition of the countertop kitchen appliance such that the charging platform supports the countertop kitchen appliance in the docked condition of the countertop kitchen appliance.

17. A countertop kitchen appliance system, comprising:

a first countertop kitchen appliance, comprising:
  a receptacle for receiving food therein; and
  a heater configured to heat food within the receptacle of the first countertop kitchen appliance;
a second countertop kitchen appliance, comprising:
  a base having a motor disposed therein;
  a receptacle coupled to the base for receiving food therein;
  a rotatable tool disposed within the receptacle of the second countertop kitchen appliance and operably coupled to the motor, such that operation of the motor drives rotation of the rotatable tool; and
  a battery coupled to the motor; and
a charging platform,
wherein the first countertop kitchen appliance is operable between a docked condition, wherein the first countertop kitchen appliance is operably coupled to the charging platform and the heater is operable to heat food, and an undocked condition, wherein the first countertop kitchen appliance is removed from the charging platform, and wherein the first countertop kitchen appliance does not include one or more of a rotatable tool, a motor, and a battery; and
wherein the second countertop kitchen appliance is operable between a docked condition, wherein the second countertop kitchen appliance is operably coupled to the charging platform such that current is delivered from the charging platform to the battery of the second countertop kitchen appliance, and an undocked condition, wherein the second countertop kitchen appliance is removed from the charging platform and the battery of the second countertop kitchen appliance is operable to power operation of the motor of the second countertop kitchen appliance.

18. The countertop kitchen appliance system of claim 17, wherein the second countertop kitchen appliance includes a heater coupled to the battery of the second countertop kitchen appliance and configured to heat food received within the receptacle of the second countertop kitchen appliance, and wherein the heater of the second countertop kitchen appliance is operable to a cooking temperature in the docked condition of the second countertop kitchen appliance and maintains food within the receptacle of the second countertop kitchen appliance at a desirable temperature for eating in the undocked condition of the second countertop kitchen appliance.

19. The countertop kitchen appliance system of claim 1, wherein the controller intermittently deactivates the heater during the operation of the heater when the countertop kitchen appliance is in the undocked condition.

20. The countertop kitchen appliance system of claim 17, wherein the first countertop kitchen appliance is a warming dish, and wherein the second countertop kitchen appliance is a blender.

\* \* \* \* \*